United States Patent
Baxendale et al.

(10) Patent No.: US 12,128,768 B2
(45) Date of Patent: Oct. 29, 2024

(54) SCHEDULED ENGINE BLOCK HEATING

(71) Applicant: Ford Global Technologies, LLC, Dearborn, MI (US)

(72) Inventors: Timothy Baxendale, Royal Oak, MI (US); Thomas Ciccone, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 498 days.

(21) Appl. No.: 17/501,394

(22) Filed: Oct. 14, 2021

(65) Prior Publication Data

US 2023/0124556 A1 Apr. 20, 2023

(51) Int. Cl.
| | |
|---|---|
| *H02J 7/00* | (2006.01) |
| *B60L 1/02* | (2006.01) |
| *B60L 53/14* | (2019.01) |
| *B60L 53/62* | (2019.01) |
| *B60L 58/12* | (2019.01) |
| *B60L 58/13* | (2019.01) |

(52) U.S. Cl.
CPC .............. *B60L 1/02* (2013.01); *B60L 53/14* (2019.02); *B60L 53/62* (2019.02); *B60L 58/12* (2019.02); *B60L 58/13* (2019.02); *B60L 2240/445* (2013.01); *B60L 2240/54* (2013.01)

(58) Field of Classification Search
CPC .......... B60L 58/12; B60L 58/13; B60L 53/14; B60L 53/62; B60L 2240/445; B60L 2240/54; B60L 1/02
USPC ............................................. 320/109; 701/22
See application file for complete search history.

(56) References Cited

U.S. PATENT DOCUMENTS

| | | | |
|---|---|---|---|
| 9,431,688 B2 | 8/2016 | Schwarz et al. | |
| 10,744,885 B2 | 8/2020 | Jammoul et al. | |
| 2009/0277705 A1* | 11/2009 | Ichikawa | B60L 50/16 180/65.21 |
| 2012/0173062 A1* | 7/2012 | Madurai Kumar | B60W 20/13 903/903 |
| 2016/0229411 A1* | 8/2016 | Murata | B60L 58/12 |
| 2020/0317187 A1 | 10/2020 | Assaliyski et al. | |

FOREIGN PATENT DOCUMENTS

| | | |
|---|---|---|
| CN | 202696179 U | 1/2013 |
| CN | 108544973 A | 9/2018 |

* cited by examiner

*Primary Examiner* — Zixuan Zhou
(74) *Attorney, Agent, or Firm* — David B. Kelley; Brooks Kushman P.C.

(57) ABSTRACT

A vehicle includes an engine block heater, a traction battery, and a controller. The controller, responsive to a temperature being less than a threshold, charges the traction battery with grid energy until a state of charge of the traction battery achieves a charge target. The controller is further programmed to, responsive to the state of charge achieving the target, discharge the traction battery to power the engine block heater until the state of charge falls below a discharge target or the temperature achieves a temperature target. The controller is also programmed to, responsive to the charge falling below the discharge target, charge the traction battery with grid energy until the state of charge achieves the charge target. Additionally, the controller is programmed to, responsive to a temperature achieving a temperature target, inhibit charging and discharging the traction battery.

17 Claims, 10 Drawing Sheets

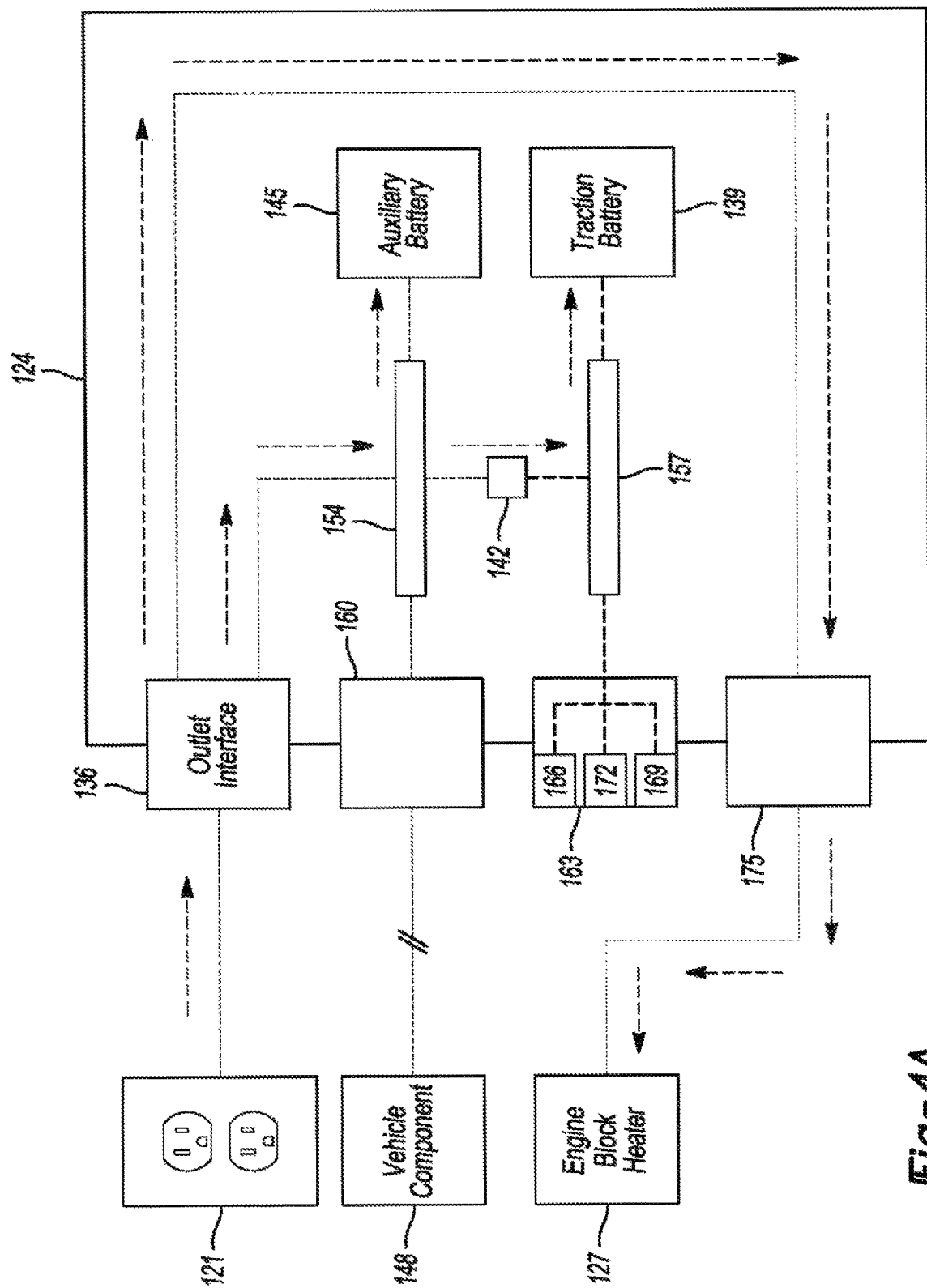

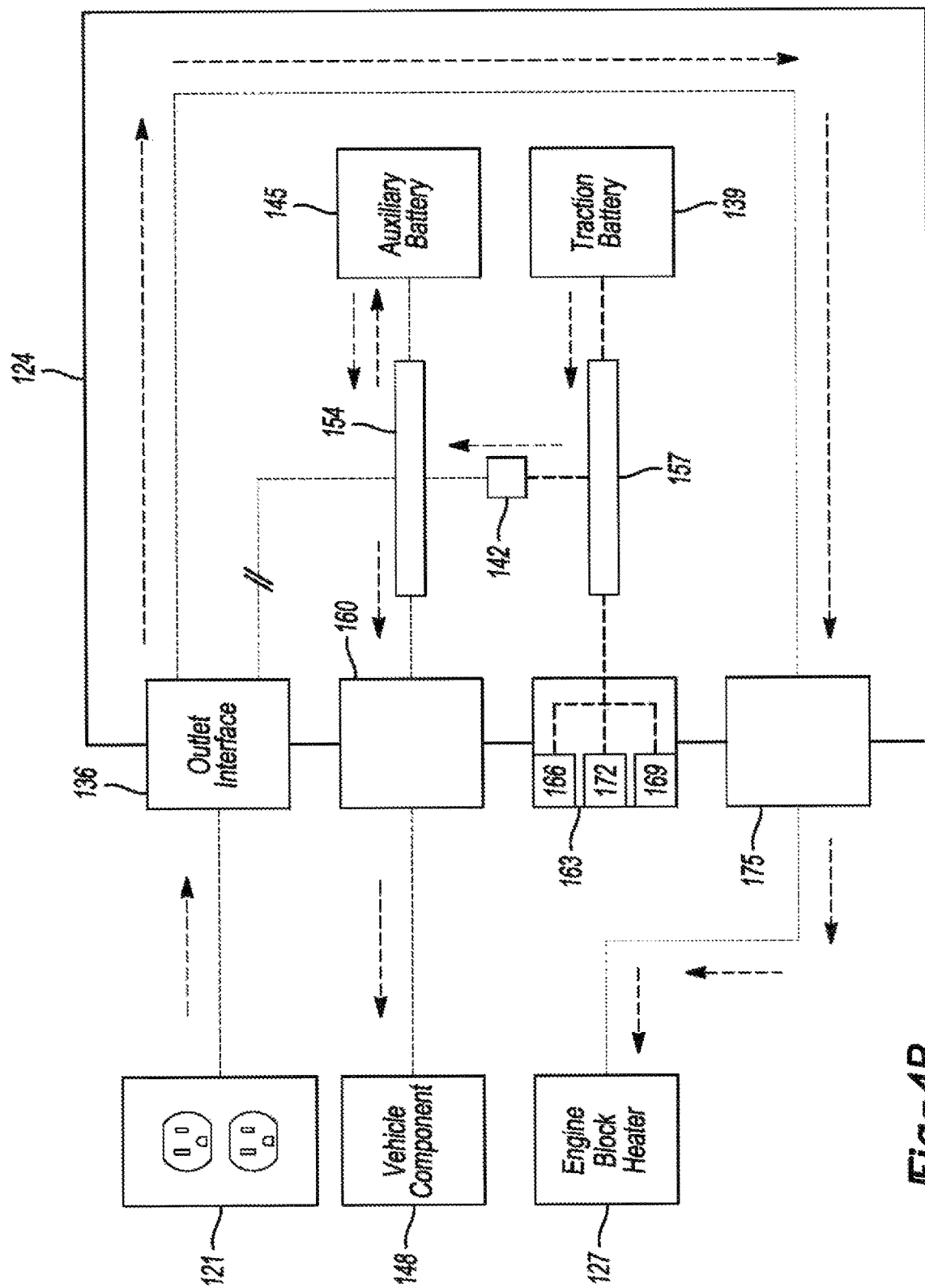

SCHEDULED ENGINE BLOCK HEATING

TECHNICAL FIELD

The present disclosure relates to systems and methods of heating an engine block.

BACKGROUND

Some internal combustion engines perform better when starting and operating above freezing temperatures. In cold climates, many vehicles are equipped with an engine block heater to improve engine performance during start-up and the beginning of a trip. Similar to engines, many vehicle batteries have better performance when operating above freezing temperatures. A hybrid vehicle having an engine block heater may benefit from heating its battery and engine simultaneously.

SUMMARY

Presented are systems and methods to preheat an engine block heater and a vehicle battery. The systems and methods presented may use resistive heating. Resistive heating is an effect caused by electrical current flowing through a resistive load that acts to increase a temperature of the resistive load. The increase in temperature may be due to electrical current flowing both towards the resistive load such as when charging, and from the resistive load such as when discharging. In some instances, a resistive load may be a vehicle battery. Since batteries have finite energy storage, a battery cannot be charged infinitely. As such, a vehicle battery benefits from the ability to heat during charging and discharging. An increase in temperature may be used to allow the vehicle battery to move from a suboptimal temperature range in which the battery is subject to premature battery degradation, low charge, and other issues, into an optimal temperature range. Embodiments of the systems and methods described may resistively heat a vehicle battery to an optimal temperature range.

One embodiment is a vehicle. The vehicle includes an engine block, a traction battery, and a controller. The controller is programmed to charge the traction battery with grid energy from a wall outlet until a state of charge of the traction battery achieves a charge target. The controller is further programmed to, responsive to the state of charge achieving the target, discharge the traction battery to power the engine block heater until the state of charge falls below a discharge target. Even further, the controller is programmed to, responsive to the state of charge falling below the discharge target, charge the traction battery with grid energy until the state of charge achieves the charge target. Additionally, the controller is programmed to, responsive to a temperature achieving a temperature target, inhibit the charging and discharging of the traction battery.

A second embodiment is an engine block heating method. The method includes discharging a traction battery to power an engine block until a state of charge of the traction battery falls below a charge target. Next, the method includes charging the traction battery with grid energy from a wall outlet until the state of charge achieves a charge target. Further, the method includes discharging the traction battery to power the engine block in response to the state of charge achieving a charge target. The method also includes inhibiting the charging and discharging of the traction battery in response to a temperature achieving a temperature target.

A third embodiment is a vehicle. The vehicle includes a traction battery, a converter, and a controller. The traction battery powers an engine block heater. The controller, responsive to a temperature being less than a threshold, permits a surplus electrical current across the converter such that the surplus electrical current both charges the traction battery and powers the engine block heater. Further, the controller, responsive to a state of charge of the traction battery achieving a threshold, permits a decreased electrical current across the converter such that the traction battery discharges to power the engine block heater.

BRIEF DESCRIPTION OF THE DRAWINGS

FIGS. 4A-4B illustrate a second power network configuration behavior.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
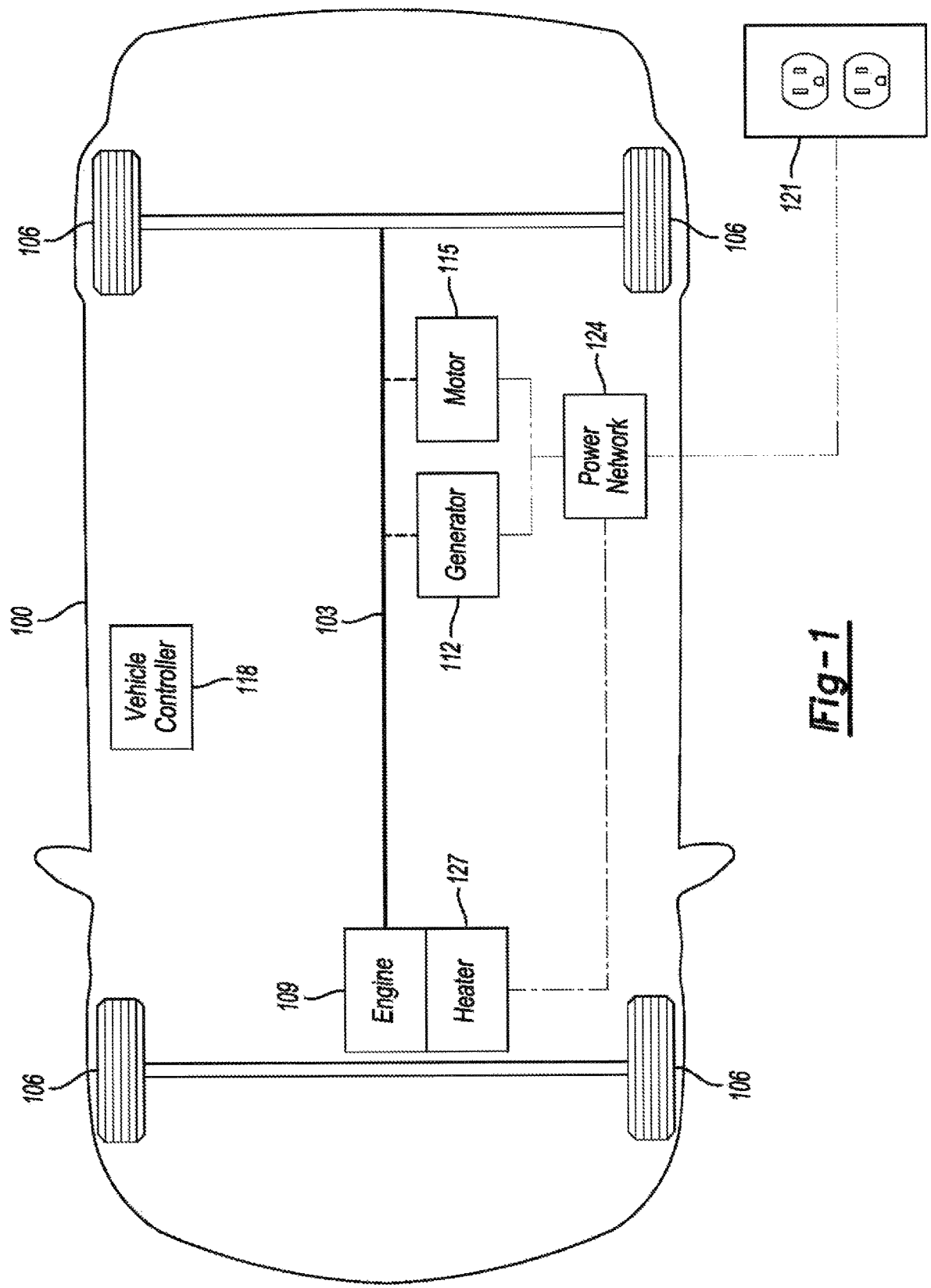
FIG. 1 illustrates a hybrid vehicle.

FIG. 1 presents a vehicle 100. The vehicle 100 comprises a drivetrain 103. The drivetrain 103 is configured to propel the vehicle 100 via a plurality of wheels 106. The drivetrain 103 may be configured to receive torque from a prime mover. As shown, the vehicle 100 contains both an engine 109 and a traction motor 115 as prime movers. In this embodiment, the engine 109 is mechanically linked to the drivetrain 103. The engine 109 may convert chemical energy from a fuel source into mechanical energy. In particular, the engine 109 may provide mechanical energy in the form of rotational energy exerted upon a crankshaft. The engine 109 may be configured to provide the mechanical energy to a transmission through the crankshaft. The engine 109 may include a plurality of sensors. One of the sensors may determine and provide the engine parameters to a vehicle controller. For example, an engine sensor may determine and provide temperature, speed, fuel economy, lubricant level, or other parameters.

The traction motor 115 may be configured to convert electrical energy into mechanical energy. For example, the traction motor 115 may be configured to receive electrical energy from a vehicle battery to provide mechanical energy to the drivetrain 103. Additionally or alternatively, the traction motor 115 may be configured to receive electrical energy from an electrical bus network. As such, the traction motor 115 may be configured to receive electrical energy from other electrical components configured to provide electrical energy to the electrical bus network. The traction motor 115 may be configured to receive AC electricity.

The vehicle 100 includes a generator 112. The generator 112 may be configured to convert mechanical energy into electrical energy. In some embodiments, the generator 112 may be configured to convert mechanical energy from an internal combustion engine into electrical energy for charging a vehicle battery. The generator 112 may also be used to convert mechanical energy from an internal combustion engine 109 into electrical energy for powering a vehicle load. The generator 112 may be configured to output AC electricity.

The power network 124 is configured to facilitate the electrical communication between power electronics within the vehicle 100. As shown, the power network 124 is in electrical communication with the generator 112 and the traction motor 115. Further, the power network 124 is configured to receive electrical current from a wall outlet 121.

The vehicle 100 further includes an engine block heater 127. The engine block heater 127 is in thermal communication with the engine 109. The engine block heater 127 is configured to increase the temperature of an engine block within the engine 109. The engine block heater 127 is also configured to convert electrical energy into thermal energy. As shown, the engine block heater 127 is in electrical communication with the power network 124. In this embodiment, the engine block heater 127 receives electrical energy from the power network 124 to increase the temperature of an engine block.

The vehicle controller 118 may have a memory system and a processor. The memory system may be configured to store instruction sets such as programs, algorithms, methods, etc. The memory system may be further configured to receive, monitor, and store values presented to the vehicle controller 118. Further, the memory may serve as a database. As such, the memory may create, store, and edit data stored in the database. The database may define a schedule. Alternatively, or additionally, the database may define a plurality of schedules. A schedule may include entries used as reference for operating a device. The processor may be configured to execute instruction sets. The vehicle controller 118 may be configured to receive signals indicative of information from external sources including but not limited to sensors, devices, and other controllers. The vehicle controller 118 may be configured to receive information by various ways including electrical communication and electrical-magnetic communication. Further, the vehicle 100 may comprise a plurality of controllers.

The vehicle controller 118 may be in communication with the engine 109, the drivetrain 103, the generator 112, the power network 124, the traction motor 115, and the engine block heater 127 of the vehicle 100. The vehicle controller 118 may further be in communication with braking systems, including a regenerative braking system and a friction braking system. The vehicle controller 118 may be configured to retrieve values from each of the components of the vehicle 100 such as engine speed, battery SOC, vehicle torque, exhaust flow, and the conditions of the power network 124.

Figure 2:
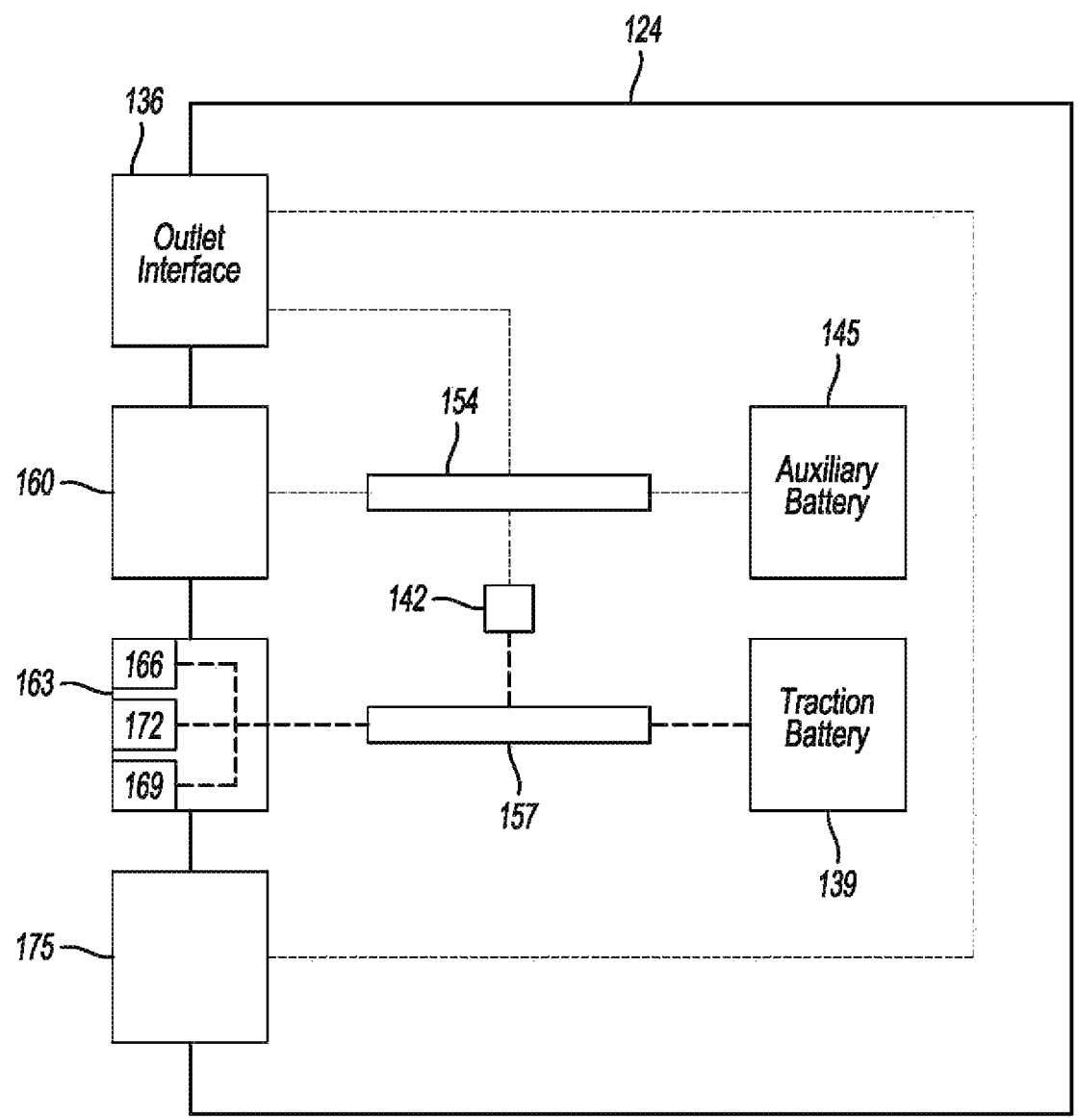
FIG. 2 illustrates a power network.

FIG. 2 illustrates a detailed view of the power network 124. The power network 124 includes a plurality of electrical bus networks 130. The plurality of electrical bus networks 130 are configured to facilitate electrical communications within a vehicle. The plurality of electrical bus networks 130 includes a low-voltage bus 154 and a high-voltage bus 157. The low-voltage bus 154 is in electrical communication with the high-voltage bus 157 via a converter 142. The converter 142 may be configured to convert electricity of a first set of electrical parameters into a second set of electrical parameters. For example, the converter 142 may be configured to convert electricity at 500 volts into electricity at 12 volts. The converter 142 may allow bi-directional electrical communication between the low-voltage bus 154 and the high-voltage bus 157. In some embodiments, the converter 142 is configured to respond to a command from a controller to regulate the direction or stop electrical communication between the low-voltage bus 154 and high-voltage bus 157.

As shown, the low-voltage bus 154 is in communication with a low-voltage bus port 160. The low-voltage bus port 160 is configured to interact with devices compatible with low-voltage DC current. In particular, the low-voltage bus port 160 is configured to work with vehicle components such as lights, alarms, etc. Further, the low-voltage bus 154 is in communication with an auxiliary battery 145. The auxiliary battery 145 is configured to provide and receive electrical current from the low-voltage bus 154. The low-voltage bus 154 may operate within 12-24 volts. Further, the low-voltage bus 154 is shown in electrical communication with an outlet interface 136. The outlet interface 136 is configured to interact with the wall outlet 121. The outlet interface 136 is configured to receive AC electrical current from the wall outlet 121, convert it into DC electrical current, and provide the DC electrical current to the low-voltage bus 154. The outlet interface 136 may use an internal rectifier to convert the electrical current from AC to DC. The outlet interface 136 may contain multiple channels to provide electrical signals from the wall outlet 121 to the power network 124. Further, the outlet interface 136 is in communication with an outlet port 175. The outlet port 175 provides access to electrical current from the outlet interface 136. The electrical current may be direct or alternating current. In some embodiments, the outlet interface 136 is configured to respond to a command from the controller 118 to stop providing electrical current to the power network 124.

As shown, the high-voltage bus 157 is in communication with a high-voltage bus port 163. The high-voltage bus port 163 is shown to have multiple channels. The high-voltage bus port 163 has a rectified channel 166, an inverted channel 169, and a DC channel 172. In some embodiments, the high-voltage bus port 163 may have a single channel. The rectified channel 166 is configured to receive AC electrical current, convert it into DC electrical current, and provide it to the high-voltage bus 157. The converted electrical current may be used to charge a vehicle battery. The rectified channel 166 may be configured to interact with the generator 112. The inverted channel 169 is configured to receive DC electrical current from the high-voltage bus 157 and convert it into AC electrical current. The inverted electrical current may be used to provide electrical energy to the traction motor 115. The DC channel 172 is configured to provide access to the high-voltage DC current of the high-voltage bus 157. Further shown, the high-voltage bus 157 is in communication with a traction battery 139. The traction battery 139 may be used to store electrical energy. Further, the traction battery 139 may be used to convert the stored electrical energy into mechanical energy to propel the vehicle 100. The traction battery 139 may include a plurality of battery cells. In some embodiments, at least two of the battery cells of the plurality of battery cells are resistively sequential. In such embodiments, the electrical potential of both of the battery cells may be summed. Alternatively, or additionally, at least two of the battery cells of the plurality of battery cells are resistively parallel. In such embodiments, the electrical current capacity may be summed. The traction battery 139 may have a plurality of sensors. One of the sensors may determine and provide battery parameters to a vehicle controller 118.

Figure 3A:
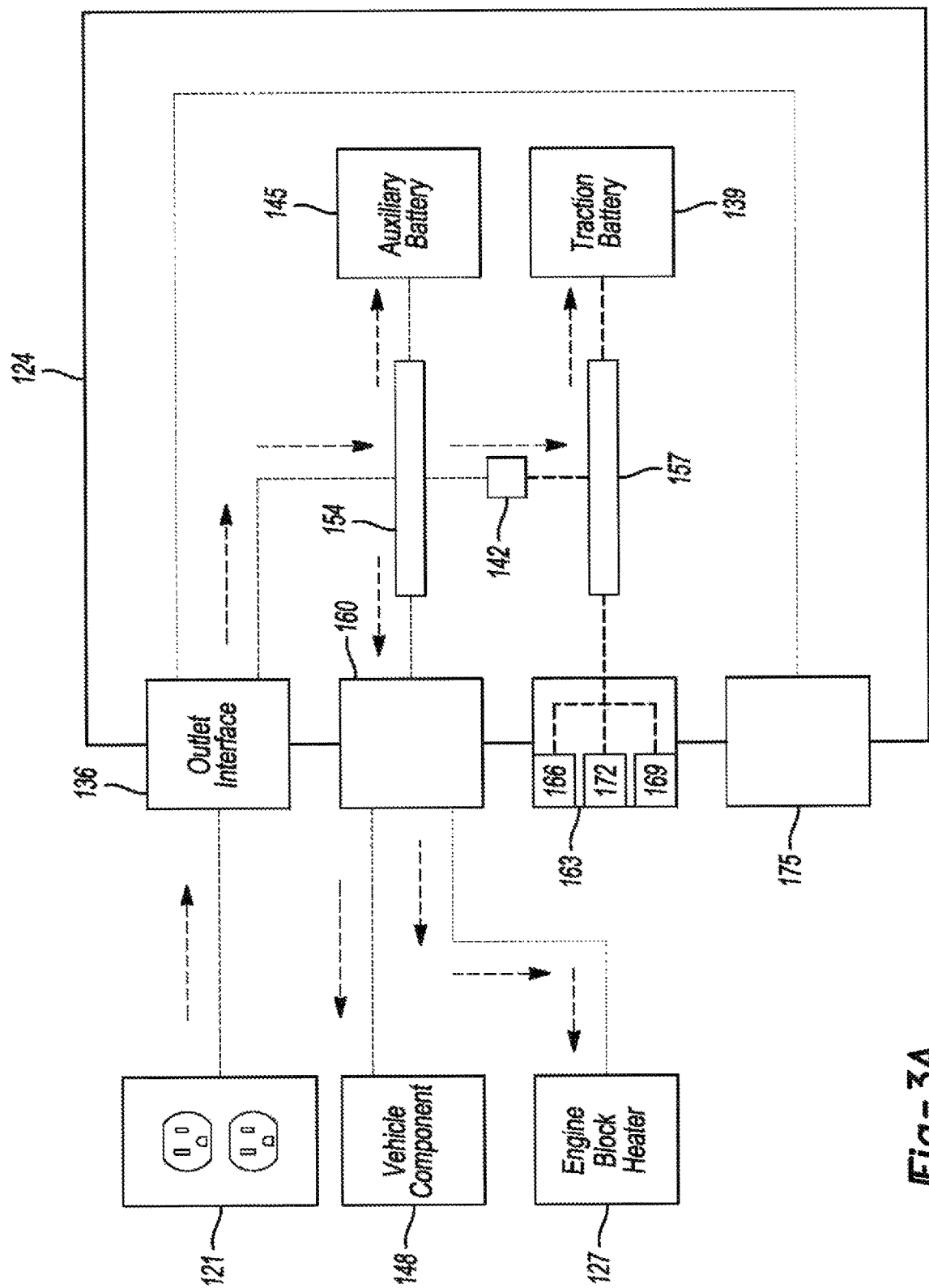
FIGS. 3A-3B illustrate a first power network configuration behavior.

FIG. 3A illustrates a first power network configuration charging behavior. Here, the engine block heater 127 is connected to the low-voltage bus port 160 of the power network 124 and the wall outlet 121 is connected to the power network 124. In this state, the wall outlet 121 provides electrical energy to power the engine block heater 127. As displayed, when the wall outlet 121 is in communication with the power network 124, an electrical current is transmitted from the wall outlet 121 to the outlet interface 136. Next, the electrical current is transmitted from the outlet interface 136 to the low-voltage bus 154. The low-voltage bus 154 provides electrical current to the auxiliary battery 145, the low-voltage bus port 160, and the high-voltage bus 157 from the current received from the outlet interface 136. Current transmitted from the low-voltage bus 154 to the auxiliary battery 145 is dependent upon the auxiliary battery 145 having available capacity. Current transmitted from the low-voltage bus 154 to the high-voltage bus 157 is facilitated through the converter 142. Current is provided from the low-voltage bus port 160 to the engine block heater 127 and the vehicle component 148. Current is also transmitted from the high-voltage bus 157 to the traction battery 139. Current transmitted to the traction battery 139 from the high-voltage bus 157 is dependent upon the traction battery 139 having available capacity.

Figure 3B:
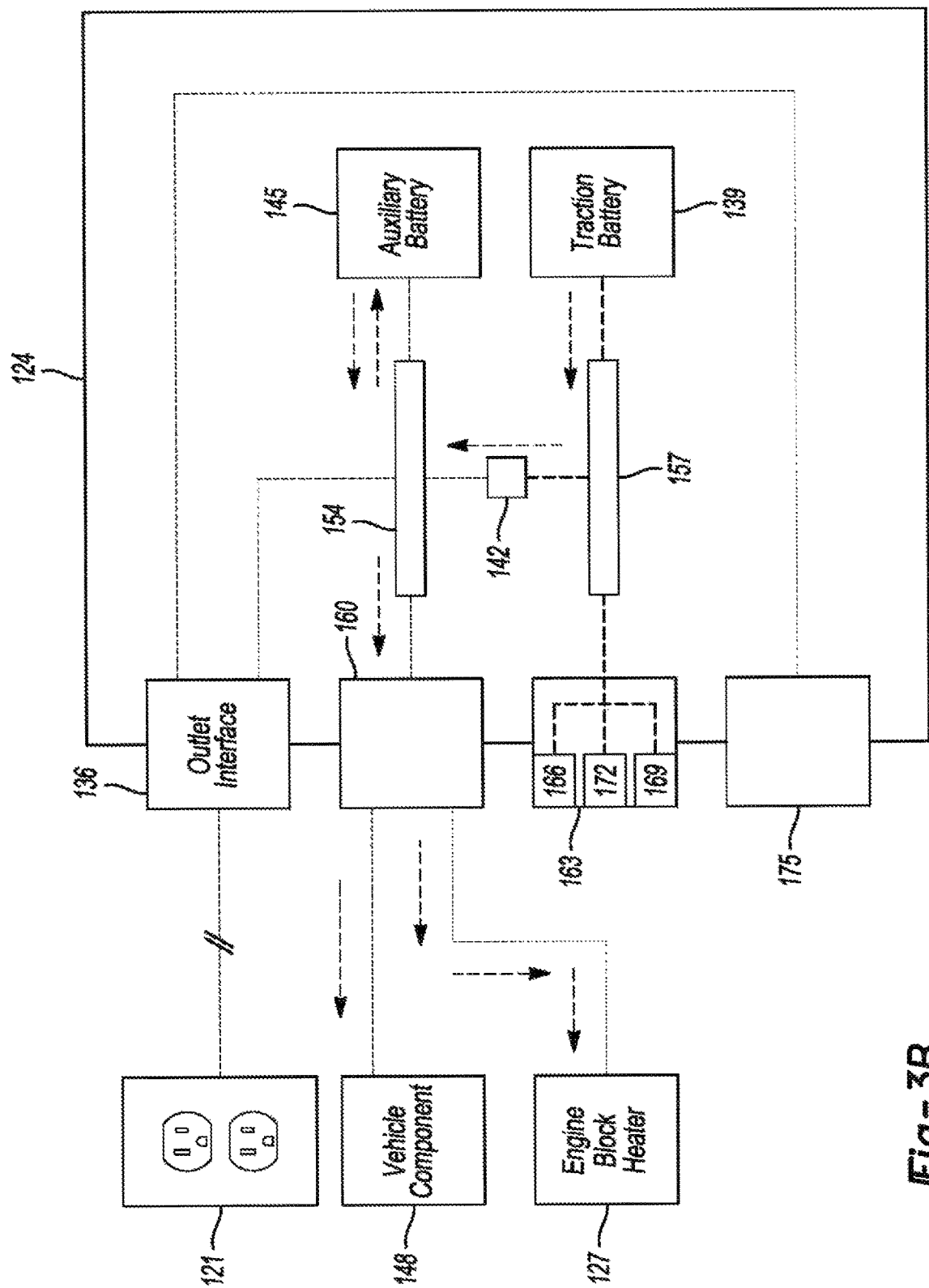

FIG. 3B illustrates the first network configuration discharging behavior. In this configuration, the traction battery 139 is discharged to power the engine block heater 127. Here, the engine block heater 127 is connected to the low-voltage bus port 160 of the power network 124 and electrical current is not received from the wall outlet 121. In this state, the traction battery 139 provides electrical energy to power the engine block heater 127. First, electrical current is transmitted from the traction battery 139 to the high-voltage bus 157. The high-voltage bus 157 then transmits electrical current to the low-voltage bus 154. The low-voltage bus 154 transmits electrical current to the low-voltage bus port 160. Based upon the SOC of the auxiliary battery 145, the low-voltage bus 154 may also charge or discharge the auxiliary battery 145. Next, the low-voltage bus port 160 provides electrical current to the engine block heater 127 and vehicle component 148.

FIG. 4A illustrates a second network configuration charging behavior. Here, the engine block heater 127 is connected to the outlet port 175 of the power network 124 and the vehicle component 148 is disconnected from the power network 124. In this configuration, the wall outlet 121 consistently provides electrical current to the engine block heater 127. As displayed, an electrical current is transmitted from the wall outlet 121 to the outlet interface 136. Next, the electrical current is transmitted from the outlet interface 136 to both the low-voltage bus 154 and the outlet port 175. Electrical current is transmitted from the outlet port 175 to power the engine block heater 127. The low-voltage bus 154 provides electrical current to the auxiliary battery 145 and the high-voltage bus 157 from the current received from the outlet interface 136. Current transmitted from the low-voltage bus 154 to the auxiliary battery 145 is dependent upon the auxiliary battery 145 having available capacity. Current is also transmitted from the high-voltage bus 157 to the traction battery 139. Current transmitted to the traction battery 139 from the high-voltage bus 157 is dependent upon the traction battery 139 having available capacity.

FIG. 4B illustrates a second network configuration discharging behavior. In this configuration, the traction battery 139 is discharged to the vehicle component 148. Here, the engine block heater 127 is connected to the outlet port 175 of the power network 124 and the vehicle component 148 is connected from the power network 124. In this state, the traction battery 139 provides electrical current to power the vehicle component 148. First, an electrical current is transmitted from the wall outlet 121 to the outlet interface 136. Next, the electrical current is transmitted from the outlet interface 136 to the outlet port 175, while the electrical current from the outlet interface 136 to the low-voltage bus 154 is inhibited. As shown, electrical current is transmitted from the outlet port 175 to power the engine block heater 127. An electrical current is transmitted from the traction battery 139 to the high-voltage bus 157. The high-voltage bus 157 then transmits electrical current to the low-voltage bus 154. The low-voltage bus 154 transmits electrical current to the low-voltage bus port 160. Based upon the SOC of the auxiliary battery 145, the low-voltage bus 154 may also charge or discharge the auxiliary battery 145. Electrical current from the low-voltage bus port 160 is used to power the vehicle component 148.

Figure 5A:
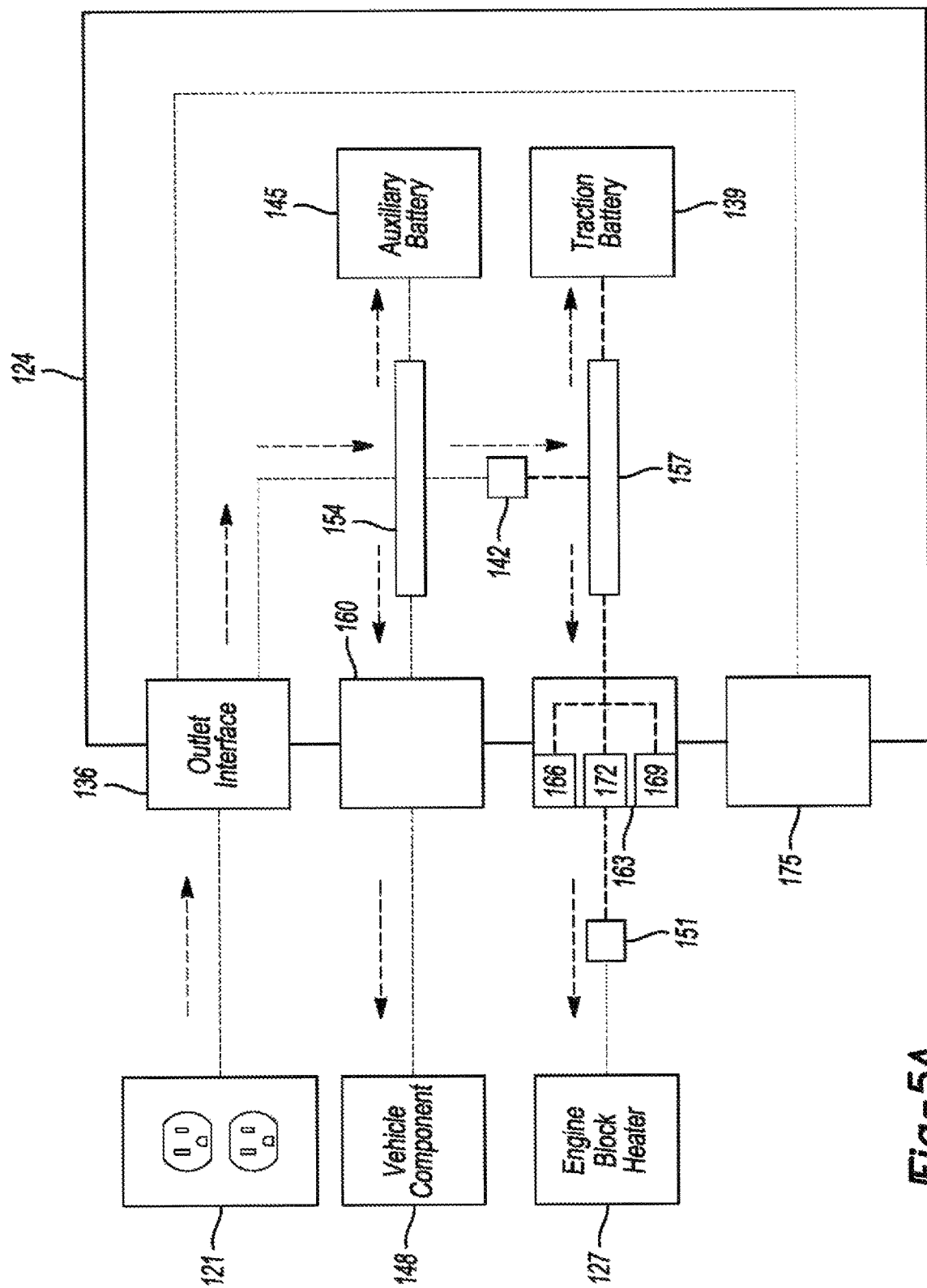
FIGS. 5A-5B illustrate a third power network configuration behavior

FIG. 5A illustrates a third power network configuration charging behavior. Here, the engine block heater 127 is connected to the high-voltage bus port 163 of the power network 124 and the wall outlet 121 is connected to the power network 124. In this state, the wall outlet 121 provides electrical energy to power the engine block heater 127. As displayed, when the wall outlet 121 is in communication with the power network 124, an electrical current is transmitted from the wall outlet 121 to the outlet interface 136. Next, the electrical current is transmitted from the outlet interface 136 to the low-voltage bus 154. The low-voltage bus 154 provides electrical current to the auxiliary battery 145, the low-voltage bus port 160, and the high-voltage bus 157 from the current received from the outlet interface 136. Current transmitted from the low-voltage bus 154 to the auxiliary battery 145 is dependent upon the auxiliary battery 145 having available capacity. Current is provided from the low-voltage bus port 160 to the vehicle component 148. Current is also transmitted from the high-voltage bus 157 to the traction battery 139 and the high-voltage bus port 163. Current transmitted to the traction battery 139 from the high-voltage bus 157 is dependent upon the traction battery 139 having available capacity. Current is transmitted from the high-voltage bus port 163 to the engine block heater 127. As shown, the current from the high-voltage bus port 163 may be converted from high-voltage to low-voltage by an additional converter 151.

Figure 5B:
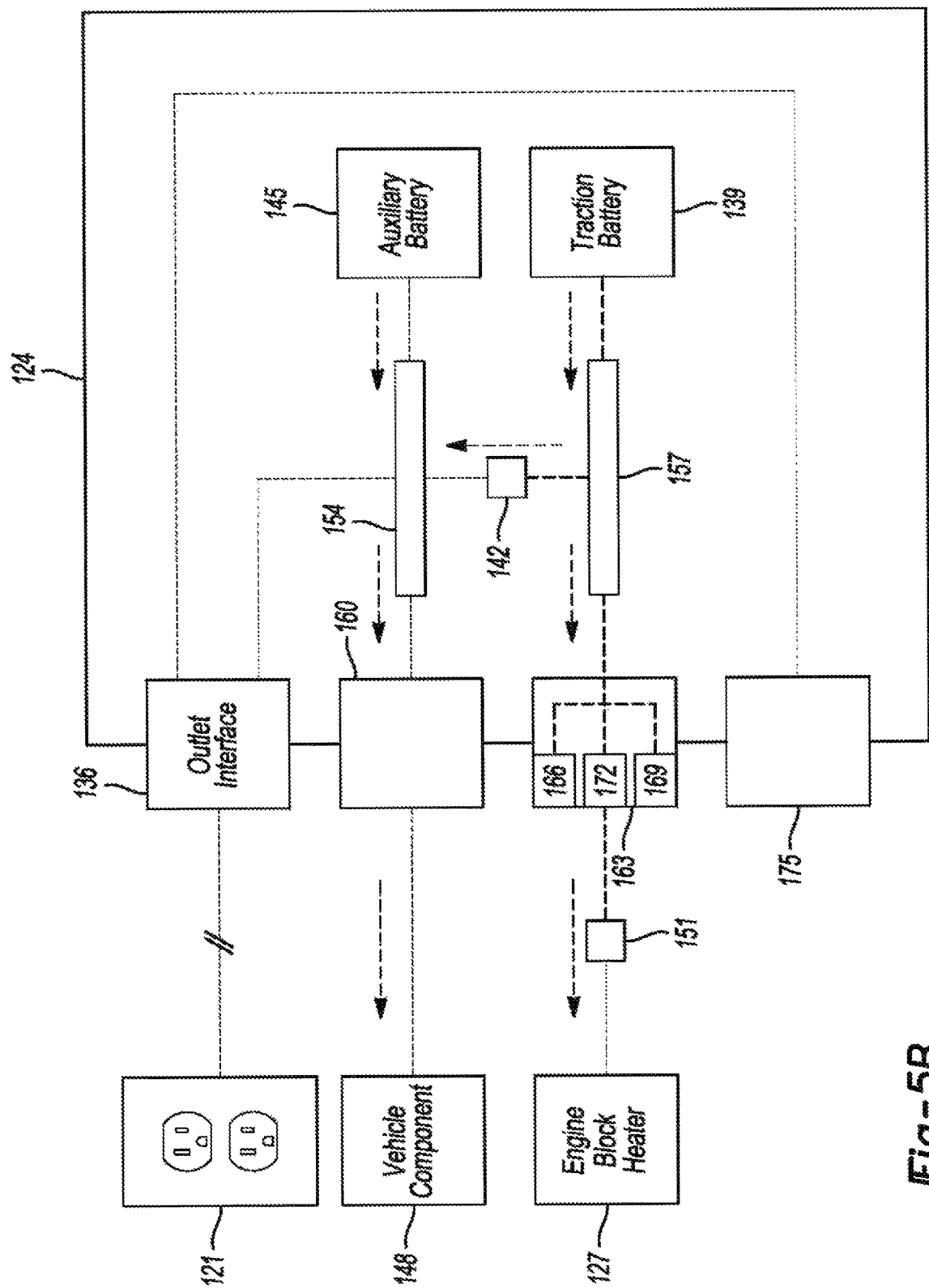

FIG. 5B illustrates a third power network configuration discharging behavior. In this configuration, the traction battery 139 is discharged to power the engine block heater 127. Here, the engine block heater 127 is connected to the high-voltage bus port 163 of the power network 124 and the wall outlet 121 is disconnected from the power network 124. In this state, the traction battery 139 provides electrical energy to power the engine block heater 127. First, the electrical current is transmitted from the traction battery 139 to the high-voltage bus 157. The high-voltage bus 157 then transmits electrical current to the low-voltage bus 154 and the high-voltage bus port 163. Current is transmitted from the high-voltage bus port 163 to the engine block heater 127. As shown, the current from the high-voltage bus port 163 may be converted by an additional converter 151 from high-voltage to low-voltage. The low-voltage bus 154 transmits electrical current to the low-voltage bus port 160. Based upon the SOC of the auxiliary battery 145, the low-voltage bus 154 may also charge or discharge the auxiliary battery 145. Next, the low-voltage bus port 160 provides electrical current to the engine block heater 127 and vehicle component 148.

Figure 6:
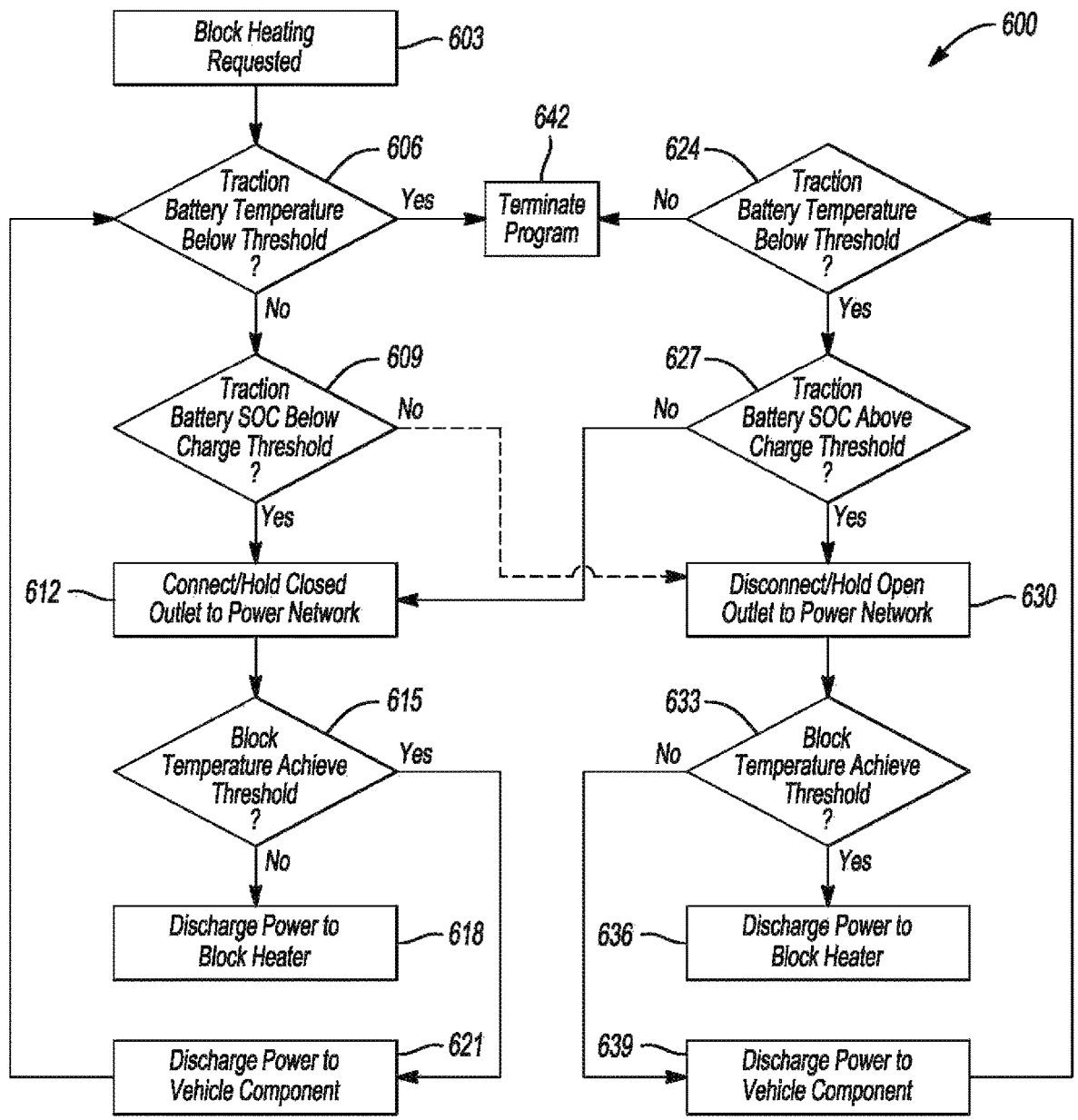
FIG. 6 illustrates a first method of regulating engine block heating.

FIG. 6 illustrates a first method of regulating engine block heating. The first battery heating method 600 starts by the vehicle controller 118 receiving a block heating request in the block heating request step 603. The request may be scheduled to occur at the expiration of a scheduled start time. In some embodiments, the request may be based upon historical data of the vehicle 100. For example, the vehicle controller 118 may be programmed to monitor a driving behavior. As a result of monitoring, the controller may predict a future trip at 8:00 AM. As such, the vehicle controller 118 may request block heating at 7:45 AM. Next, in the determine traction battery temperature step 606, the vehicle controller 118 may determine the temperature of the traction battery. If the temperature of the traction battery 139 is above a predetermined threshold, the vehicle controller 118 may terminate the program in the terminate cycle step 642. If the temperature of the traction battery 139 is below the predetermined threshold, the controller will compare the SOC of the traction battery 139 to a predetermined threshold in the compare SOC to charge target step 609.

If the SOC of the traction battery 139 is below than the predetermined charge threshold, the controller will connect or hold closed a connection from the wall outlet 121 to the power network 124 in the connect outlet step 612. Further, the controller will determine the temperature of the engine block in the monitor block temperature step 615. If the engine block temperature is less than a predetermined temperature threshold, the vehicle controller 118 will instruct the power network 124 to discharge power to the engine block heater 127 in the power to block heater step 618. If the engine block temperature is greater than a predetermined temperature threshold, the vehicle controller 118 will instruct the power network 124 to discharge power to the vehicle component 148 in the power to component step 621. After discharging to either the engine block heater 127 or the vehicle component 148, the method will return to the determine traction battery temperature step 606.

If the SOC of the traction battery 139 is above the predetermined charge threshold, the controller will disconnect or hold open a connection from the wall outlet 121 to the power network 124 in the disconnect connect outlet step 630. Further, the controller will determine the temperature of the engine block in the monitor block temperature step 633. If the engine block temperature is less than a predetermined temperature threshold, the vehicle controller 118 will instruct the power network 124 to discharge power to the engine block heater 127 in the power to block heater step 636. If the engine block temperature is greater than a predetermined temperature threshold, the vehicle controller 118 will instruct the power network 124 to discharge power to the vehicle component 148 in the power to component step 639. After discharging to either the engine block heater 127 or the vehicle component 148, the vehicle controller 118 will compare the temperature of the traction battery 139 to the predetermined threshold in the determine traction battery temperature step 624. If the temperature of the traction battery 139 is above a predetermined threshold, the vehicle controller 118 may terminate the program in the terminate cycle step 642. If the temperature of the traction battery 139 is below the predetermined threshold, the controller will compare the SOC of the traction battery 139 to a predetermined discharge threshold in the compare SOC to discharge target step 627. If the SOC of the traction battery 139 is above the predetermined discharge threshold, the vehicle controller 118 will move to the disconnect connect outlet step 630. If the SOC of the traction battery 139 is below the predetermined discharge threshold, the method will move to the connect outlet step 612.

Figure 7:
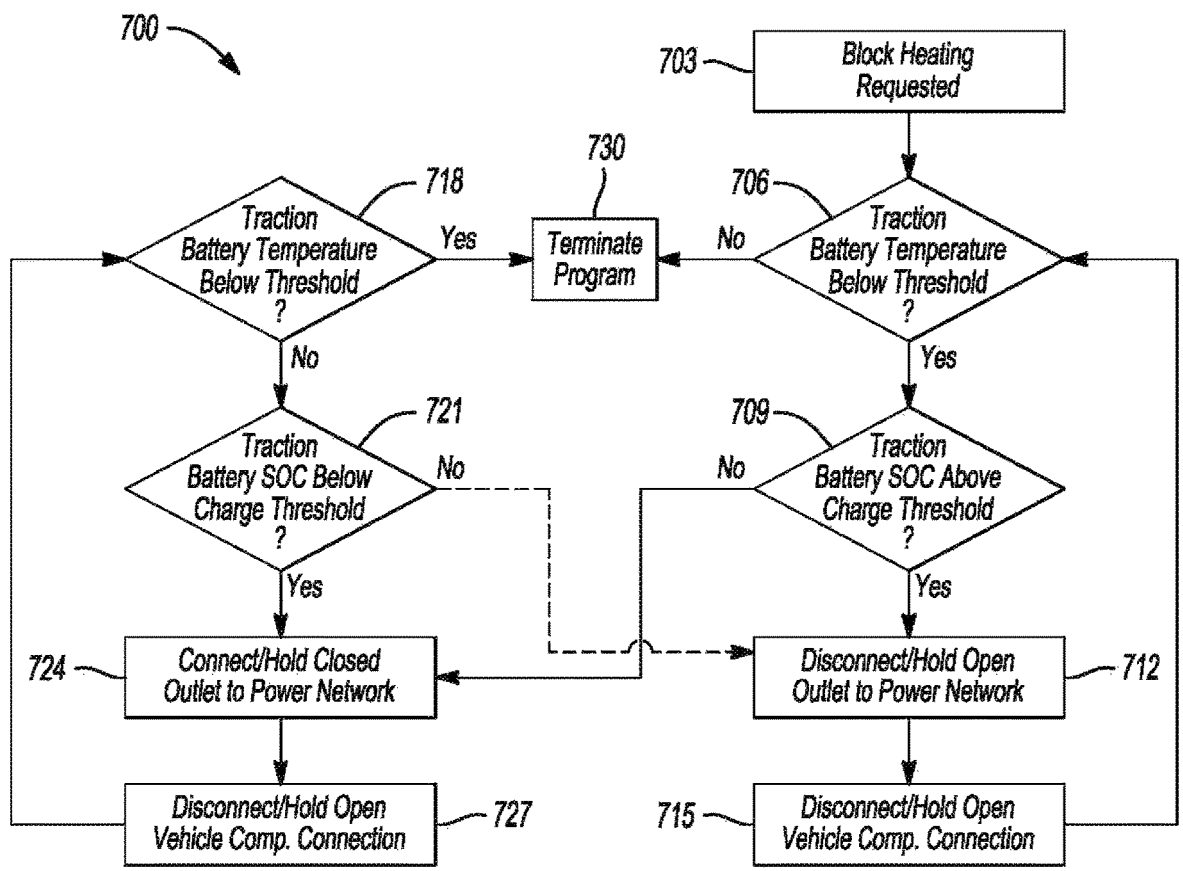
FIG. 7 illustrates a second method of regulating engine block heating.

FIG. 7 illustrates a second method of regulating engine block heating. The second battery heating method 700 starts by the vehicle controller 118 receiving a block heating request in the block heating request step 703. The request may be scheduled to occur at the expiration of a predetermined time. In some embodiments, the request may be based upon historical data of the vehicle 100. For example, the vehicle controller 118 may be programmed to monitor a driving behavior. As a result of monitoring, the controller may predict a future trip at 8:00 AM. As such, the vehicle controller 118 may request block heating at 7:45 AM. Next, in the determine traction battery temperature step 706, the vehicle controller 118 may determine the temperature of the traction battery. If the temperature of the traction battery 139 is above a predetermined threshold, the vehicle controller 118 may terminate the program in the terminate cycle step 730. If the temperature of the traction battery 139 is below the predetermined threshold, the controller will compare the SOC of the traction battery 139 to a predetermined threshold in the compare SOC to discharge target step 709.

If the SOC of the traction battery 139 is above the predetermined discharge threshold, the controller will disconnect or hold open a connection from the wall outlet 121 to the power network 124 in the disconnect connect outlet step 712. Next, the vehicle controller 118 will connect or hold closed a connect from the vehicle component 148 to the power network 124. This will allow the power network 124 to discharge power to the vehicle component 148. After discharging to the vehicle component 148, the controller will return to the determine traction battery temperature step 706.

If the SOC of the traction battery 139 is below the predetermined discharge threshold, the controller will connect or hold closed a connection from the wall outlet 121 to the power network 124 in the connect outlet step 724. The vehicle controller 118 will also disconnect or hold open a connection between the vehicle component 148 and the power network 124. In this state, the wall outlet 121 will act to charge the traction battery 139.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine block heater;
   a traction battery; and
   a controller programmed to,
   charge the traction battery with grid energy until a state of charge of the traction battery achieves a charge target,
   responsive to the state of charge achieving the charge target, discharge the traction battery to power the engine block heater until the state of charge falls below a discharge target, responsive to the state of charge falling below the discharge target, charge the traction battery with grid energy until the state of charge achieves the charge target, and responsive to a temperature achieving a temperature target, inhibit the charging and discharging of the traction battery.

2. The vehicle of claim 1, wherein the controller is further programmed to, responsive to the state of charge achieving the charge target, remove connection with a source of the grid energy.

3. The vehicle of claim 2, wherein the controller is further programmed to, responsive to the temperature being less than the threshold and the state of charge achieving the charge target, discharge the traction battery to power the engine block heater.

4. The vehicle of claim 2, wherein the controller is further programmed to, responsive to the temperature being less than the threshold and a state of charge of an auxiliary battery achieving an auxiliary charge target, remove connection with a source of the grid energy.

5. The vehicle of claim 1, wherein the controller is further programmed to, during a scheduled start time, discharge the traction battery to power the engine block heater.

6. The vehicle of claim 5 wherein the scheduled start time is based in part on historical data of vehicle use.

7. An engine block heating method comprising:
discharging a traction battery to power an engine block until a state of charge of the traction battery falls below a discharge target;
charging the traction battery with grid energy until the state of charge achieves a charge target;
discharging the traction battery to power an engine block heater in response to the state of charge achieving the discharge target; and
inhibiting the charging and discharging of the traction battery in response to a temperature achieving a temperature target.

8. The method of claim 7 further comprising disconnecting a wall outlet in response to the state of charge achieving the charge target.

9. The method of claim 8 further comprising discharging the traction battery to power a vehicle component in response to a temperature being less than a threshold.

10. The method of claim 7 further comprising converting an initial voltage from one of an auxiliary battery and a wall outlet to an increased voltage, and disconnecting the wall outlet in response to the state of charge of the auxiliary battery achieving an auxiliary charge target.

11. The method of claim 7 further comprising discharging the traction battery to power the engine block heater in response to an expiration of a scheduled start time.

12. The method of claim 11 wherein the scheduled start time is based in part on historical data of vehicle use.

13. A vehicle comprising:
a traction battery configured to power an engine block heater;
a converter configured to charge the traction battery; and
a controller programmed to,
responsive to a temperature being less than a threshold,
permit a surplus electrical current across the converter, such that the surplus electrical current both charges the traction battery and powers the engine block heater,
responsive to a state of charge of the traction battery achieving a threshold,
permit a decreased electrical current across the converter such that the traction battery discharges to power the engine block heater, and
responsive to the temperature achieving a temperature target,
inhibit charging and discharging the traction battery.

14. The vehicle of claim 13, wherein the controller is further programmed to,
responsive to the converter receiving a charging electrical current from a wall outlet, close a connection within an additional converter to power the engine block heater.

15. The vehicle of claim 14, wherein the controller is further programmed to,
responsive to the state of charge achieving a threshold, inhibit a charging current from a wall outlet.

16. The vehicle of claim 14, wherein the controller is further programmed to,
responsive to a state of charge of an auxiliary battery being greater than a threshold, inhibit a charging current from a wall outlet.

17. The vehicle of claim 13, wherein the controller is further programmed to,
responsive to the state of charge being below a threshold, inhibit current flow to the engine block heater.

* * * * *